3,751,425
1-METHYL-AND 1 - ETHYLTHIOETHYLCARBAMOYL-SUBSTITUTED BENZIMIDAZOLES

Hans Osieka, Ludwigshafen, Karl Heinz Koenig Frankenthal, and Gerhard Bolz and August Amann, Ludwigshafen, Germany, assignors to Badische Anilin- & Soda-Fabrik Aktiengesellschaft, Ludwigshafen (Rhine), Germany
No Drawing. Filed Mar. 10, 1971, Ser. No. 122,995
Claims priority, application Germany, Mar. 14, 1970,
P 20 12 219.4
Int. Cl. C07d 49/38
U.S. Cl. 260—309.2     4 Claims

ABSTRACT OF THE DISCLOSURE

Benzimidazoles bearing, as substituents, a carbamoyl radical in the 1-position and a mercapto carboxylamino radical in the 2-position. The compounds are suitable (in appropriate pharmaceutical preparations) as agents for treating and curing fungus diseases and as prophylactics therefor.

---

The invention relates to substituted benzimidazoles, their production, and preparations containing them. The invention also relates to agents which are active against pathogenic fungi.

We have found that substituted benzimidazoles having the general Formula I:

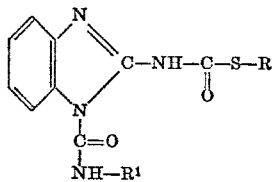

where

R denotes alkyl having one to six carbon atoms which may bear chlorine as a substituent, or allyl, methacrylyl or benzyl, and $R^1$ denotes alkyl having one to six carbon atoms which may bear chlorine as a substituent or phenyl, benzyl, alkoxyalkyl, allyloxyalkyl, phenyloxyalkyl, alkylthioalkyl, alkenylthioalkyl, furfurylthioalkyl, phenylthioalkyl, benzylthioalkyl or carbalkoxyalkyl are very effective against pathogenic fungi.

The alkyl radical R may denote methyl, ethyl, propyl, isopropyl, butyl, isobutyl, sec-butyl, tert-butyl pentyl, neopentyl or hexyl. The alkyl radical $R^1$ may denote methyl, ethyl, propyl, isopropyl, butyl, isobutyl, sec-butyl, tert-butyl, pentyl, neopentyl, hexyl and the other alkyl isomers or homologs having one to six carbon atoms. The alkoxyalkyl radical $R^1$ may be especially radicals up to $C_6$—O—$C_4$ such as methoxyethyl, ethoxyethyl, propoxyethyl, isopropoxyethyl, butyloxyethyl, methoxypropyl, ethoxypropyl, propoxypropyl, methoxybutyl, ethoxybutyl, butyloxybutyl, allyloxyethyl or phenyloxyethyl. The alkyl moiety in the allyloxyalkyl or phenyloxyalkyl radical may also be methyl, ethyl, propyl or butyl. Those alkoxyalkyl radicals are preferred which contain a total of up to eight carbon atoms. The thioalkyl radical $R^1$ may be methylthioethyl, ethylthioethyl, propylthioethyl, butylthioethyl, allylthioethyl, isobutylthioethyl, sec-butylthioethyl, tert-butylthioethyl, pentylthioethyl, hexylthioethyl, benzylthioethyl, phenylthioethyl, furfurylthioethyl, methylthiopropyl, ethylthiopropyl, propylthiopropyl, isopropylthiopropyl, allylthiopropyl, trichloroallylthiopropyl, butylthiopropyl, isobutylthiopropyl, sec-butylthiopropyl, tert-butylthiopropyl, pentylthiopropyl, hexylthiopropyl, benzylthiopropyl, phenylthiopropyl, furfurylthiopropyl, β-hydroxyethylthioethyl, β-hydroxyethylthiopropyl, methylthiobutyl, ethylthiobutyl, allylthiobutyl or hexythiobutyl. The preferred alkylthioalkyl radicals are those up to $C_6$—S—$C_4$, particularly the furfurylthioalkyl, phenylthioalkyl and benzylthioalkyl radicals which contain alkyl having up to four carbon atoms. Carbalkoxyalkyl radicals $R^1$ may be for example carbomethoxymethyl, carbomethoxyethyl, carboethoxymethyl and carboethoxyethyl, those substituents being preferred in which each of the alkyl moieties has up to six carbon atoms.

The new compounds may be prepared by reacting a benzimidazole derivative having the Formula II:

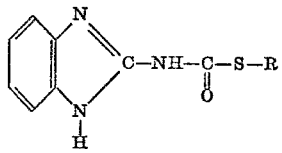

with an isocyanate having the formula:

$$R^1—NCO$$

(R and $R^1$ having the meanings given above) in the presence or absence of solvents within a wide range of temperatures, preferably at from 20° to 100° C.

Another possible method of preparing the new compounds consists in reacting a benzimidazole derivative having the Formula IV

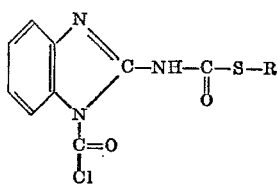

with an amine having the formula:

$$R^1—NH_2$$

(R and $R^1$ having the meanings given above) in the presence of compounds capable of binding hydrogen chloride such as triethylamine, trimethylamine, pyridine or an alkali metal hydroxide or carbonate.

Compounds having the Formula II may also be reacted with a urethane having the formula $R^2$—OCONH$R^1$ where $R^2$ denotes a hydroxyl compound suitable for the formation of a urethane. $R^2$OH may accordingly be an aliphatic, cycloaliphatic, heterocyclic, aromatic or aromatic aliphatic alcohol, preferably an alkyl alcohol having one to six carbon atoms or phenyl alcohol.

The starting material for the production of the benzimidazole derivatives (II) is a S-lower-alkyl pseudothiourea which may be present in the form of a salt, preferably as a sulfate, and it is reacted with one to two equivalents of a chloroformic thioester having the Formula III:

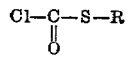

where R has the meanings given above. The reaction product gives with o-phenylenediamine the benzimidazole derivative (II).

The new compounds have a notable antimycotic action. They are therefore suitable for comating pathogenic fungi among which are included in the present context pathogenic fungi of the skin, namely *Trichophyton mentagrophytes, Trichophyton rubrum, Microsporon gypseum* and *Epidermophyton floccosum*. The compounds may be used in therapy and in general hygiene. They are accordingly suitable as agents for the treatment of fungus diseases of the skin and for prophylatic treatment. They are also suitable for the hygienic treatment of articles of daily use.

Compounds having the general Formula I in which R denotes alkyl having one to four carbon atoms and $R^1$ denotes alkylthioalkyl, carbalkoxyalkyl or chloroalkyl with up to four carbon atoms have produced particularly remarkable results in tests for antimycological effectiveness.

The new compounds may be obtained according to the following examples.

EXAMPLE 1

22.8 parts by weight of thiourea in 20 parts by weight of water is reacted with 25 parts by weight of dimethylsulfate at room temperature. 40 parts by weight of thioethyl chloroformate is added at 0° to 5° C. and the whole is neutralized to pH 6.5. 32.4 parts by weight of o-phenylenediamine dissolved in glacial acetic acid is introduced into this mixture at 70° C. and the whole is stirred for some time. The 2-ethylmercaptocarbonylaminobenzimidazole having the formula:

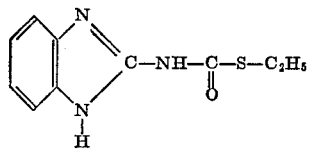

is separated and washed with a mixture of water and acetone. The melting point is 320° C. with decomposition.

11 parts by weight of the benzimidazole derivative obtained is dissolved in 200 parts by weight of pyridine and 40° C. 5.9 parts by weight of methylthioethyl thiocyanate (Annalen, 565, 75 (1949)) is added. The whole is stirred at 40° C. until a clear solution has been formed (about thirty minutes), and the compound:

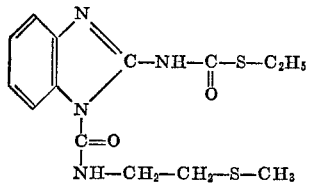

is precipitated with water from the solution and recrystallized from a mixture of water and acetone. Melting point 128° to 131° C. The yield of 1-methylthioethylcarbamoyl-2 - ethylmercaptocarbonylaminobenzimidazole is 85% based on the intermediate benzimidazole derivative.

Other new compounds may be prepared in the same way, for example:

| Example 2 | 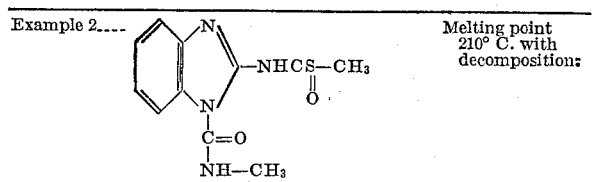 | Melting point 210° C. with decomposition. |
| Example 3 | 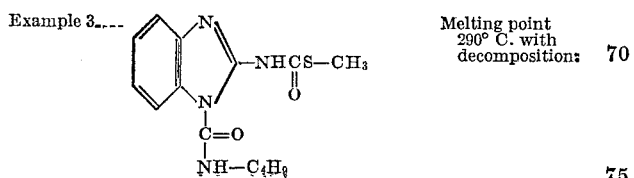 | Melting point 290° C. with decomposition. |
| Example 4 | 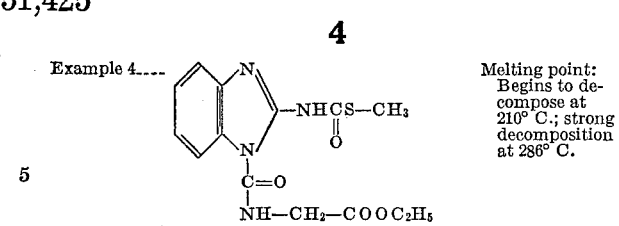 | Melting point: Begins to decompose at 210° C.; strong decomposition at 286° C. |
| Example 5 | 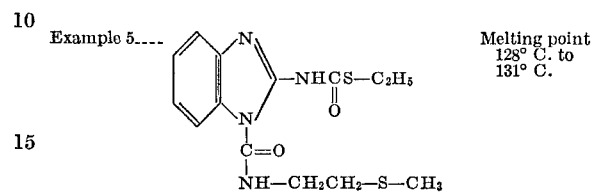 | Melting point 128° C. to 131° C. |
| Example 6 | 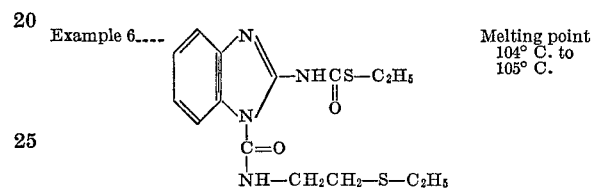 | Melting point 104° C. to 105° C. |
| Example 7 | 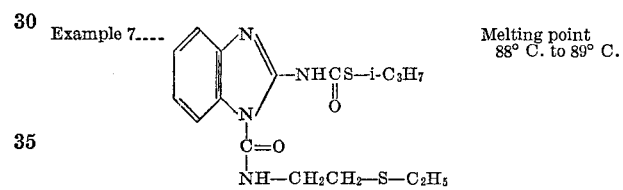 | Melting point 88° C. to 89° C. |
| Example 8 | 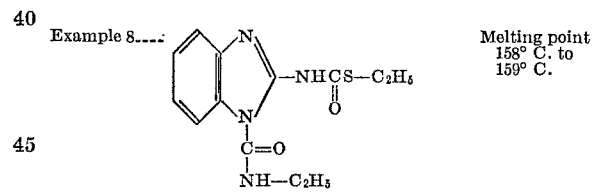 | Melting point 158° C. to 159° C. |
| Example 9 | 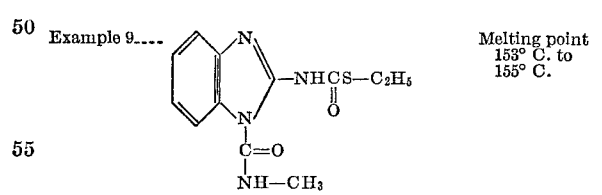 | Melting point 153° C. to 155° C. |
| Example 10 | 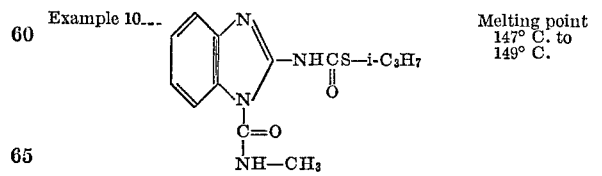 | Melting point 147° C. to 149° C. |
| Example 11 | 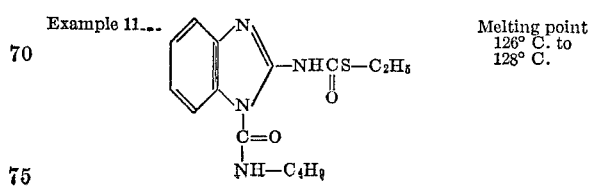 | Melting point 126° C. to 128° C. |

Example 12... 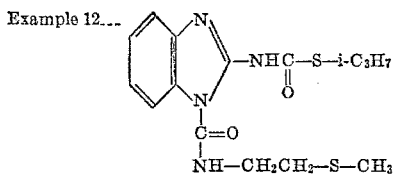 Sinters at 74° C.; decomposes at 136° C.

Example 13... 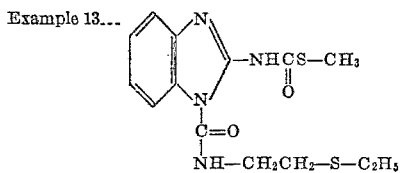 Melting point 132° C. to 133° C.

Example 14... 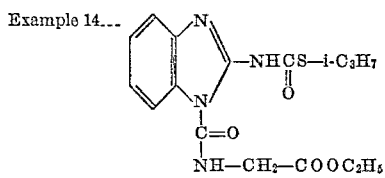 Melting point 115° C. to 116° C. with decomposition.

Example 15... 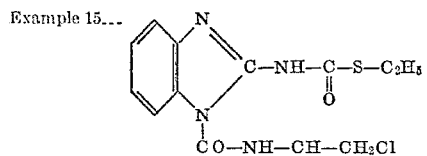 Melting point 156° C.

The compounds are identified by elementary analysis and infrared spectroscopy.

Pharmaceutical preparations containing the substituted benzimidazoles of this invention may be all the preparations of this type which are used against fungus diseases, i.e. powders, ointments, preparations for brushing and sprays, including those for the treatment of oral cavities and of the external ear. The concentration of the active ingredient may be from about $0.5\gamma$ to about $500\gamma$ per gram of the preparation ready for use; concentrations for use which are below and above the said limits are also possible.

The following table gives the spectrum of effectiveness of some of the new compounds determined in vitro in a successive dilution test. R and $R^1$ in the table denote substituents in the general formula:

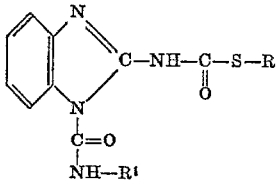

In the table:
Tm = *Trichophyton mentagrophytes*
Tr = *Trichophyton rubrum*
Mg = *Microsporon gypseum*
Ef = *Epidermophyton floccosum*
+ = Effective in a concentration of $100\gamma$/ml.
++ = Effective in a concentration of $10\gamma$/ml.
+++ = Effective in a concentration of $1\gamma$/ml.

TABLE

| R | $R_1$ | Tm | Tr | Mg | Ef |
|---|---|---|---|---|---|
| $CH_3$ | $CH_3$ | + | ++ | ++ | ++ |
| $CH_3$ | $C_4H_9$ | + | + | ++ | ++ |
| $CH_3$ | $CH_2-COOC_2H_5$ | ++ | + | ++ | ++ |
| $C_2H_5$ | $CH_2-CH_2-S-CH_3$ | ++ | +++ | ++ | ++ |
| $C_2H_5$ | $CH_2-CH_2-S-C_2H_5$ | | +++ | ++ | ++ |
| $i-C_3H_7$ | $CH_2-CH_2-S-C_2H_5$ | | + | + | + |

We claim:
1. A substituted benzimidazole having the formula

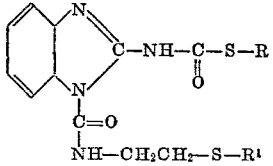

where R denotes alkyl of one to four carbon atoms and $R^1$ denotes methyl or ethyl.

2. A compound as claimed in claim 1 where R is ethyl or isopropyl.

3. A compound as claimed in claim 1 wherein each of R and $R^1$ is ethyl.

4. A substituted benzimidazole as claimed in claim 1 wherein R is isopropyl and $R^1$ is methyl.

References Cited
UNITED STATES PATENTS

| 3,660,421 | 5/1972 | Osieka et al. | 260—309.2 |
| 3,541,213 | 11/1970 | Klopping | 260—309.2 |
| 3,631,176 | 12/1971 | Klopping | 260—309.2 |
| 3,573,321 | 3/1971 | Di Cuollo et al. | 260—309.2 |
| 3,574,845 | 4/1971 | Actor et al. | 260—309.2 |

NATALIE TROUSOF, Primary Examiner

U.S. Cl. X.R.
424—273